United States Patent Office 3,055,827
Patented Sept. 25, 1962

3,055,827
SEPARATION OF SUSPENDED SOLIDS
Ralph M. Wiley, Midland, Mich., assignor to The Dow Chemical Company, Midland, Mich., a corporation of Delaware
No Drawing. Filed June 16, 1958, Ser. No. 742,430
7 Claims. (Cl. 210—53)

This invention is concerned with the flocculation, sedimentation, and separation of finely divided solids from aqueous suspensions thereof and is particularly directed to a novel method for accomplishing such separation more efficiently and completely.

It has recently become known that certain water-soluble, high molecular weight, acrylic polymers are highly effective as agents for agglomeratnig finely divided mineral solids from aqueous suspensions and thereby increasing the rates of sedimentation and filtration thereof. Such agents have proved to be an outstanding aid in facilitating the separation of finely divided solids from aqueous suspensions, for example, in the mineral dressing, chemical processing, and water clarification arts. However, certain problems have remained unsolved. For example, where the suspension of finely divided solids contains appreciable quantities of extremely fine material, such as colloidally dispersed clay minerals, it is sometimes found that the acrylic polymer alone fails to flocculate or agglomerate a portion of the extremely fine suspended solids so that the supernatant liquid after sedimentation remains cloudy. In other cases while clarity of the supernatant liquid is satisfactory with the presently known agents it would be desirable to increase the rate of sedimentation even further than is presently possible. Also, certain of the presently known agents are not particularly effective on organic suspensions.

It is an object of the present invention to provide an improved method for flocculating and agglomerating finely divided solids in aqueous suspension. It is a further object to provide a method for accelerating the rate of sedimentation of solids from such suspensions. Yet another object is to provide a method for clarifying the supernatant liquid resulting from sedimentation of such suspensions. Other objects will become apparent from the following specification and claims.

In accordance with the present invention, it has been discovered that the treatment of suspensions of finely divided mineral solids with a combination of polymeric agents consisting of a water-soluble polymer or copolymer of a vinyl-benzyl quaternary ammonium salt and a synthetic, high molecular weight, water-soluble, acrylic polymer results in the agglomeration of the solids and in improved rates of sedimentation and filtration of the finely divided solids and the production of supernatant liquid of improved clarity thereby facilitating the separation of the solids from the suspension. It is among the advantages of the invention that by employing the combination of polymeric agents as herein described, equal sedimentation rates may be obtained with a smaller total amount of the combination of polymeric agents than is required with either agent alone. It is a further advantage of the invention that the combination of polymeric agents is effective on suspensions of organic materials as well as of minerals.

The acrylic polymers employed in the present invention are water-soluble, substantially linear polymers of high molecular weight obtained by vinyl polymerization of acrylamide or copolymerization of acrylamide with other suitable monomers such as methacrylamide, acrylonitrile, methacrylonitrile, acrylic and methacrylic acids and the salts and lower alkyl esters thereof, vinylbenzene sulfonic acid, vinyl alkyl ethers and the like. In general the copolymers employed are prepared from a mixture consisting of at least about 85 mole percent of acrylamide and not more than 15 mole percent of other monomers, except that copolymers of acrylamide with acrylic or methacrylic acid or their salts may be used when prepared from mixtures of acrylamide with up to 80 mole percent or more of acrylic or methacrylic acid or a salt thereof. Acrylamide polymers are generally characterized by a greater or less degree of hydrolysis, that is, some of the carboxamide groups are converted to carboxyl groups. This condition is dependent upon the method of manufacture of the polymer, the presence or absence of acrylic acid as a comonomer and conditions of storage of the polymer. The polymer products appear to be equivalent whether the carboxyl content results from copolymerization of acrylamide with acrylic acid or a salt thereof or from hydrolysis of amide groups subsequent to polymerization.

The vinyl-benzyl-quaternary-ammonium compounds employed in the present invention may be homopolymers of vinyl-benzyl-quaternary-ammonium salts or copolymers of a vinyl-benzyl-quaternary-ammonium compound with acrylamide or methacrylamide. Said copolymers may contain in polymerized form from a very small amount up to about 95 mole percent of the acrylamide or methacrylamide ingredient. Such polymers and copolymers contain a plurality of groups having the following structure:

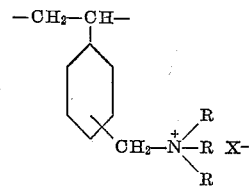

wherein each R represents a lower alkyl radical containing from 1 to 4 carbon atoms, inclusive, and X represents an anion such as hydroxyl, chloride, bromide, iodide, methosulfate or the like. The preferred vinyl-benzyl-quaternary-ammonium polymers and copolymers are those having a viscosity of at least 1.2 centipoises for a 0.5 percent by weight solution thereof in an aqueous 4 percent by weight sodium chloride solution at 25° C.

In carrying out the invention it is essential that the combination of polymeric agents be thoroughly mixed with the aqeuous suspension of finely divided solids and in general it is preferred that one of the components of the combination be added to and thoroughly mixed with the suspension prior to the introduction of the other component. The exact order of addition of said components will vary depending upon such factors as the nature of the suspended solids, the particular components of the combination of polymeric agents employed, the salt content of the aqueous medium and the pH of the suspension. In any given instance the preferred method of addition may be readily predetermined by ascertaining the rate of sedimentation of suspended solids in small scale tests in jars or cylinders employing the direct combination of polymeric agents and also alternative orders of addition of the components of said combination to the particular substrate to be treated. In any case, following the admixture of the combination of polymeric agents with the suspension, vigorous agitation, which tends to break down the agglomerates formed by the treatment, is avoided and the treated suspension is filtered or introduced into a sedimentation vessel to accomplish separation of the suspended solids from the bulk of the aqueous medium.

The amounts of the polymeric agents to be employed will vary depending upon such factors as the nature of the suspended solids and of the aqueous medium, the pH of the medium and the size distribution and amount of finely divided solids in suspension. In general, from about 0.01 to about 1 pound of the combination of polymeric agents is employed per ton of suspended solids, although with highly absorptive and very fine solids such as bentonitic clays higher amounts of up to 40 pounds of the combination per ton of suspended solids may be employed. Depending upon various factors such as the aforementioned, the proportions of poly(vinylbenzyl quaternary ammonium compound) to acrylic polymer may vary in the range of from about 5 to 200 parts of the former to 100 parts of the latter. The exact proportions preferred for any particular suspension may be determined by small scale tests as set forth above.

The following examples illustrate the invention but are not to be construed as limiting the same.

*Example 1*

Wyoming bentonite was suspended in water with vigorous stirring to produce an aqueous suspension containing 3 percent by weight of the bentonite and the suspension thereafter diluted with water to produce a stock suspension containing 0.5 percent by weight of bentonite. 10-milliliter portions of said stock suspension were placed in 25 milliliter graduates. Varying amounts of one or both of the polymeric agents were dissolved in 10-milliliter portions of water and each of the resulting solutions was added to one of the portions of stock suspension. The addition was made in 5 equal increments with agitation by inverting the cylinder to accomplish mixing after each increment was added. Following the additions and mixing, the graduates were placed upright and the volume of sedimented solids recorded at various times thereafter. On completion of the sedimentation period the clarity of the supernatant liquid was observed. The results are summarized in the following table.

| Polymeric Agent | Amount of Agent, Grams | Milliliters of Settled Solids After Indicated Time in Minutes | | | Appearance of Supernatant Liquid |
|---|---|---|---|---|---|
| | | 1 | 2 | 10 | |
| A | 0.001 | 19.8 | 19.5 | 6.5 | Cloudy. |
| B | 0.0001 | 19.8 | 19.0 | 10.5 | Hazy. |
| Mixture of: | | | | | |
| A | 0.0009 | } 11.0 | 8.0 | 5.0 | Slight haze. |
| B | 0.0001 | | | | |

Agent A was a polyacrylamide characterized by hydrolysis of about 4 percent of its carboxamide groups to carboxyl groups and having a viscosity of 5 centipoises for an aqueous 0.5 percent by weight solution thereof adjusted to a pH of 3 at a temperature of 25° C.

Agent B was a poly(vinylbenzyl trimethylammonium chloride).

*Example 2*

A further determination was carried out as in Example 1 employing the same polymeric agents except that in one case the agents were mixed first and the aqueous solution of the mixture added to the bentonite suspension, while in the second case a solution of polymeric Agent A of Example 1 was added to the suspension followed by a solution of polymeric Agent B of Example 1. In each case 0.0004 gram of Agent A and 0.0002 gram of Agent B was employed. The concentrations and amounts of the solutions of polymeric agents were adjusted to provide a total volume of 20 milliliters after addition of the agents to the suspension. The rates of sedimentation were determined as in Example 1 and the results are summarized in the following table.

| Manner of Addition | Milliliters of Settled Solids After Indicated Time in Minutes | | | Appearance of Supernatant Liquid |
|---|---|---|---|---|
| | 1 | 2 | 10 | |
| Mixture of Agents | 18.5 | 16.5 | 8 | Hazy. |
| Agent A Followed by Agent B | 18.0 | 15.0 | 6.5 | Clear. |

Similar results showing improved rates of sedimentation and clarity of supernatant liquid when employing the above combination of polymeric agents were obtained employing a 10 percent by weight suspension of a foundry-sand bonding clay and a 5 percent by weight suspension of fire clay.

*Example 3*

A series of starch suspensions are prepared by agitating 5 grams of waxy maize starch in 100 milliliters of water until thoroughly mixed. The resulting suspensions were placed in graduated cylinders and an aqueous solution of a mixture of polymeric agents added thereto portionwise with thorough mixing by inversion of the graduated cylinder after each addition. Following such addition the graduates were brought to an upright position and the time for the appearance of 50 milliliters of clear overhead liquid was recorded. In such operation the rate of sedimentation in inches per minute was also determined and the condition of the overhead observed. The polymeric agents employed were: (1) Agent C: a water-soluble polyacrylamide characterized by hydrolysis of about 5 percent and having a viscosity of about 15 centipoises for an aqueous 0.5 percent by weight solution thereof at a pH of 3 and a temperature of 25° C. and (2) Agent D: a water-soluble, high molecular weight copolymer prepared by vinyl polymerization of a mixture of equimolar proportions of acrylamide and vinylbenzyl trimethylammonium chloride. The results obtained were as follows:

When the suspension was treated with Agent C alone, the solids failed to settle any more rapidly than in an untreated portion of the starch suspension. When a further portion of the suspension was treated with 0.2 pound of Agent D alone per ton of starch, sedimentation occurred to give 50 milliliters of slightly cloudy overhead in 104 seconds for a settling rate of 2.12 inches per minute. Further portions of the starch suspension were treated with a solution of a mixture of 1.5 parts by weight of Agent D and 1 part by weight of Agent C. The suspensions were treated at rates of 0.1 and 0.2 pound of said mixture per ton of starch. At said 0.1 pound rate the starch settled to give 50 milliliters of slightly cloudy overhead in 86 seconds for a settling rate of 2.62 inches per minute while the suspension treated at the 0.2 pound rate gave 50 milliliters of clear overhead in 74 seconds for a settling rate of 3.08 inches per minute. The settling rate was improved even more when Agent C was added to the suspension first, followed by Agent D at the above rates of treatment.

*Example 4*

In a Canadian ore processing operation for the recovery of uranium, finely ground ore is concentrated by sedimentation and filtration prior to being leached with acid. In such operation about 0.02 pound of polyacrylamide is routinely employed per ton of solids in the suspension fed to the thickener for sedimentation.

However, problems were being encountered in that very fine solids were being carried over in the overflow liquid from the thickener. The treatment was modified to introduce 0.008 pound of an agent substantially identical to Agent D in Example 3 prior to the addition of the polyacrylamide. This resulted in improved rates of sedimentation of the suspended solids and substantially complete clarity of overflow from the thickener.

*Example 5*

A slurry containing about 30 percent by weight of finely divided solids obtained by grinding of a uranium ore from the Blind River area in Canada was divided into portions and treated by adding an aqueous solution of (1) a polymeric agent substantially identical to Agent D of Example 3 or of (2) an Agent E: polyacrylamide characterized by hydrolysis of about 4 percent and by a viscosity of about 9 centipoises for an aqueous 0.5 percent by weight solution thereof at a pH of 3 and a temperature of 25° C. or (3) by adding solutions (1) and (2) successively with intervening thorough mixing. It was determined that the solids settled more rapidly when the slurry was treated with 0.008 pound of the agent of solution (1) per ton of solids followed by 0.0166 pound of Agent E per ton of solids than when the slurry was treated with 0.033 pound per ton of either of said agents alone.

I claim:

1. A method for facilitating the separation of finely divided solids from aqueous suspension which comprises admixing with the suspension a combination of a water-soluble poly(vinylbenzyl quaternary ammonium compound) selected from the group consisting of homopolymers of vinylbenzyl trialkylammonium salts and copolymers of a vinylbenzyl trialkylammonium salt with a member of the group consisting of acrylamide and methacrylamide, wherein said alkyl groups contain from 1 to 4 carbon atoms, and a water-soluble high molecular weight acrylic polymer, in an amount sufficient to agglomerate said solids.

2. A method according to claim 1 wherein the combination of polymeric agents is employed in the amount of at least about 0.01 pound per ton of solids.

3. A method according to claim 1 wherein the poly(vinylbenzyl quaternary ammonium compound) is employed in the proportions of from 5 to 200 parts by weight thereof per 100 parts by weight of the acrylic polymer.

4. A method according to claim 1 wherein the acrylic polymer is a polyacrylamide.

5. A method according to claim 1 wherein the poly(vinylbenzyl quaternary ammonium compound) is prepared by vinyl copolymerization of a mixture of acrylamide with at least 5 mole percent of a vinylbenzyl trialkylammonium salt wherein the alkyl groups contain from 1 to 4 carbon atoms, inclusive.

6. A method according to claim 1 wherein the poly(vinylbenzyl quaternary ammonium compound) is a polyvinylbenzyl trimethylammonium chloride.

7. A method for facilitating the separation of finely divided solids from aqueous suspension which comprises admixing with said suspension a combination of a water-soluble poly(vinylbenzyl quaternary ammonium compound) selected from the group consisting of homopolymers of vinylbenzyl trialkylammonium salts and copolymers of a vinylbenzyl trialkylammonium salt with a member of the group consisting of acrylamide and methacrylamide, wherein said alkyl groups contain from 1 to 4 carbon atoms, and a water-soluble high molecular weight acrylic polymer, said poly(vinylbenzyl quaternary ammonium compound) and acrylic polymer being added to the suspension successively in predetermined order with intervening thorough mixing and said combination being employed in an amount sufficient to agglomerate the suspended solids.

References Cited in the file of this patent

FOREIGN PATENTS

| | | |
|---|---|---|
| 760,869 | Great Britain | Nov. 7, 1956 |
| 761,021 | Great Britain | Nov. 7, 1956 |